United States Patent
Gollapudi et al.

(10) Patent No.: US 7,099,888 B2
(45) Date of Patent: Aug. 29, 2006

(54) ACCESSING A REMOTELY LOCATED NESTED OBJECT

(75) Inventors: Sreenivas Gollapudi, Cupertino, CA (US); Debashis Saha, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 530 days.

(21) Appl. No.: 10/400,735

(22) Filed: Mar. 26, 2003

(65) Prior Publication Data

US 2004/0193608 A1 Sep. 30, 2004

(51) Int. Cl.
*G06F 7/00* (2006.01)

(52) U.S. Cl. ................ 707/103; 707/1; 707/2; 707/3; 707/10

(58) Field of Classification Search ............ 707/1, 707/2, 3, 10, 103
See application file for complete search history.

(56) References Cited

U.S. PATENT DOCUMENTS 6,061,690 A * 5/2000 Nori et al. .............. 707/103 R

OTHER PUBLICATIONS

The American Heritage College Dictionary, 4th edition, p. 1132, 2004.*
Lee et al., On processing nested queries in distributed object-oriented database systems, In Proceedings RIDE-DOM '95, IEEE Computer Society Press, pp. 10-17, Mar. 1995.*
Dictionary.com, "compressed", p. 1, 2005.*

* cited by examiner

*Primary Examiner*—Tim Vo
*Assistant Examiner*—Cheyne D. Ly
(74) *Attorney, Agent, or Firm*—Hickman Palermo Truong & Becker LLP

(57) ABSTRACT

A method and apparatus are provided for providing access to a remotely located nested object in a distributed database system. For example, a first server receives a request to access a complex database object that is not situated at the first server. When this occurs, the first server sends a second request to a second server. When the first server receives data in response to the second request, it detects whether the received data includes a reference to a nested object. If the first server detects a reference to a nested object, the first server modifies the received data by replacing the reference with a virtual reference to the nested object. The first server stores mapping data that associates the virtual reference with the reference and with an associated server, wherein the associated server is capable of resolving the reference. The first server forwards the modified data to the requestor.

48 Claims, 9 Drawing Sheets

ACCESSING A REMOTELY LOCATED NESTED OBJECT

FIELD OF THE INVENTION

The present invention relates to database systems, and, more specifically, to providing optimized access to nested objects located on remote servers.

BACKGROUND OF THE INVENTION

Database systems consist of objects that store information or data, referred to as database objects. One type of database object is a database table, which is logically represented by information arranged in rows and columns. Data stored in a particular row is referred to as a record, and each record is organized into one or more fields of data. The type of information stored in a particular field is determined by the data type of the column in which that field is located. FIG. 2 depicts an employee table 200 to provide an example of a database table. As shown in FIG. 2, row 202 of employee table 200 stores a record of information about employee Bob Smith 212. Each row in employee table 200 comprises three fields of data. One field stores employee name 210, which is Bob Smith 212 for row 202. Another field stores education 220, which is High School 222 for row 202. Yet another field stores employment history 230, which for row 202 is represented by a nested table 204.

A database object is managed by one or more database servers. A database server that manages a database object is considered to be a "managing database server" relative to the database object. A managing database server is capable of providing indirect access to the database object to other entities. Therefore, any entity, other than a managing database server, that wishes to access a database object must access the database object indirectly by submitting a request to a managing database server for that database object. An entity that submits a request to a database server to access a database object is referred to herein as a "client". There are many forms of clients. For example, a client may be a database application, or another database server that is not managing the database object to which access is sought.

A database server is "local" with respect to a client if the server is in direct communication with the client. For example, as shown in FIG. 1, server 120 is in direct communication with client 110, so server 120 is a local server relative to client 110. A database server that is not in direct communication with a client is referred to as a remote database server. For example, as shown in FIG. 1, server 130 communicates with client 110 indirectly, through local server 120, so server 130 is a remote server relative to client 110.

I. Processing a Request to Access a Database Object

When a client wishes to access an object of data, the client communicates a request to a local database server. Upon receiving the request, the local database server determines whether the object of data specified by the request is a local object. A database object is a local object with respect to a database server if the database server is a managing database server of the object. For example, remote server 130 manages object 132, so database object 132 is a local object of remote server 130.

A. Processing a Request to Access a Local Database Object

If an object specified by a client's request is situated at the local server to which the request is submitted, then the local database server performs processing to provide access to the requested object. For example, if a client submits a query to obtain data from a table situated at a local database server, then the local database server performs processing to retrieve the data and return the data to the client. Part of the processing to provide access to the requested object includes creation of a data structure internal to the local server, which stores information about various aspects of the client's request. For example, the data structure created to store information about a query on a database table is called a cursor. Some of the information stored in a cursor includes fields of the table requested by the query, the type of data in each of those fields, and a filter used to extract the requested fields from a particular row. This filter is referred to as a row source.

For example, assume that local server 120 manages employee table 200, and client 110 queries local server 120 for the employee name 210 stored in various records of employee table 200. In this case, local server 120 creates a cursor, which stores information that client 110 queried the employee name field 210, and that the type of data stored in this field is a string of characters. Among other information, the cursor also stores a row source for the query. When the employee name field 210 of a particular record is being retrieved, the row source from the cursor is used to extract the data in the employee name field 210 of that record.

B. Processing a Request to Access a Remote Database Object

If a database object specified by a client's request is not situated at the local database server to which the request was submitted, then the local database server performs remote mapping of the client's request. During remote mapping, the local server translates a request received from a client to access an object to a remote-mapped request from the local server to a remote server to access the object. Once a local server performs remote mapping, it sends the remote-mapped request to the remote server at which the database object is situated.

Upon receiving the request, the remote server performs processing to carry out the request. Processing performed by the remote server to carry out the request is similar to processing performed by a local server when the requested object is situated on the local server. For example, if client 110 submits a query to obtain data from a table situated at remote server 130, then remote server 130 receives a remote mapped query from local server 120. Remote server 130 then creates a data structure to store information about various aspects of the query, retrieves the requested data by using the information stored in the data structure, and sends the requested data to local server 120 from which it received the request. Local server 120 receives the requested data and forwards the data to client 110.

II. Processing a Request to Access a Complex Object

A database object may have two types of attributes: scalar and nested. A scalar attribute comprises scalar data such as character or integer variables. A nested attribute of a database object stores another database object, which is referred to as a nested object. A database object in which at least one attribute stores a nested object is called a complex object. One example of a complex database object is a complex table in which one field is a nested table. As shown in FIG. 2, employee table 200 is a complex table in which one field is nested table 204. Nested table 204 stores employment history 230 for employee Bob Smith 212. Nested table 204 stores two records. The first record is stored in first row 206 of nested table 204, while the second record is stored in second row 208 of nested table 204.

A. Processing a Request to Access a Local Complex Object

Accessing a Local Complex Object

When a client submits a request to access a complex object, the complex object may be situated at a local server that received the request from the client, or at a remote server. If the complex object is situated at the local server, then the local server performs processing to carry out the request, including creation of a data structure to store information about various aspects of the request. For example, client 110 may request local server 120 to retrieve data from a particular row of a complex table that is situated at local server 120. In this case, local server 120 generates references for each nested object in the particular row. Local server 120 also retrieves data from the scalar attributes of the particular row. The requested data returned to client 110 includes scalar data from the particular row, along with the generated references for each nested object in the particular row.

Specifically, if a particular nested object is a nested table, then local server 120 generates a cursor for a query on the nested table, and data returned to client 110 includes a reference to the cursor, which is called a reference cursor. For example, client 110 requests local server 120 to retrieve row 202 of employee table 200, wherein employee table 200 is situated at local server 120. In this case, local server 120 generates a cursor for nested table 204, and the data returned to client 110 includes a reference cursor for nested table 204.

Accessing a Local Nested Object

Once a client has obtained data from a complex object, which includes a reference to a nested object, the client may submit another request to access the nested object referred to by the reference. The client's request specifies a particular nested object by using the reference to the nested object. The client submits the request to the local server, which is able to resolve the reference because the nested object is situated at the local server. For example, client 110 may submit a request to access nested table 204 by using the reference cursor for nested table 204. If nested table 204 is situated at local server 120, then local server 120 is capable of providing access to nested table 204 by resolving the reference cursor identified in the request from client 110.

B. Processing a Request to Access a Remotely Located Complex Object

Accessing a Remote Complex Object

With reference to FIG. 1, assume that client 110 attempts to access a complex database object 134 situated at remote server 130. When client 110 makes a request to access complex object 134, local server 120, which receives the request, translates the request to a remote-mapped request. Local server 120 then sends the remote-mapped request to remote server 130, on which complex object 134 is situated. For example, complex object 134 may be a complex table, and client 110 may request data from a particular row of the complex table, wherein the particular row includes a nested object. In this case, remote server 130 processes the request, which includes generating a reference to the nested object. Remote server 130 then retrieves and returns the requested data, including the reference to the nested object, to local server 120. Local server 120 forwards this data, including the reference, to client 110.

For example, if complex object 134 is employee table 200 and client 110 requests the data from row 202, then the requested data includes nested table 204, and remote server 130 generates a cursor for data requested from nested table 204. Remote server 130 retrieves the requested data, and returns the requested data to local server 120. The returned data includes a reference cursor for nested table 204, and is forwarded to client 110 by local server 120.

Inability to Access a Remote Nested Object

To access the nested object situated at remote server 130, client 110 submits another request to local server 120. When client 110 submits the request to access the nested object, client 110 identifies the nested object by using the previously received reference to the nested object. When local server 120 receives this request from client 110, local server 120 attempts to resolve the reference and access the nested object referred to by the reference. A particular server is able to resolve a reference to a nested object only if that particular server manages the nested object. Unfortunately, local server 120 is unable to resolve the reference in the client's request because the reference refers to a nested object that is situated at remote server 130. Since local server 120 is unable to resolve the reference, local server 120 knows not how to handle the client's request to access the nested object.

For example, client 110 may submit a request to access nested table 204 by using the reference cursor for nested table 204. This request may take the form of a fetch to retrieve data from nested table 204. Local server 120 is unable to resolve the reference cursor that is specified in the client's request because nested table 204, about which local server 120 has no knowledge, is situated at remote server 130. Therefore, local server 120 is unable to recognize the nested table referred to by the reference. As explained above, a local server is unable to provide access to a remotely located nested object. Since a client may access a database object only through a local server, a client is unable to access a remotely located nested object.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
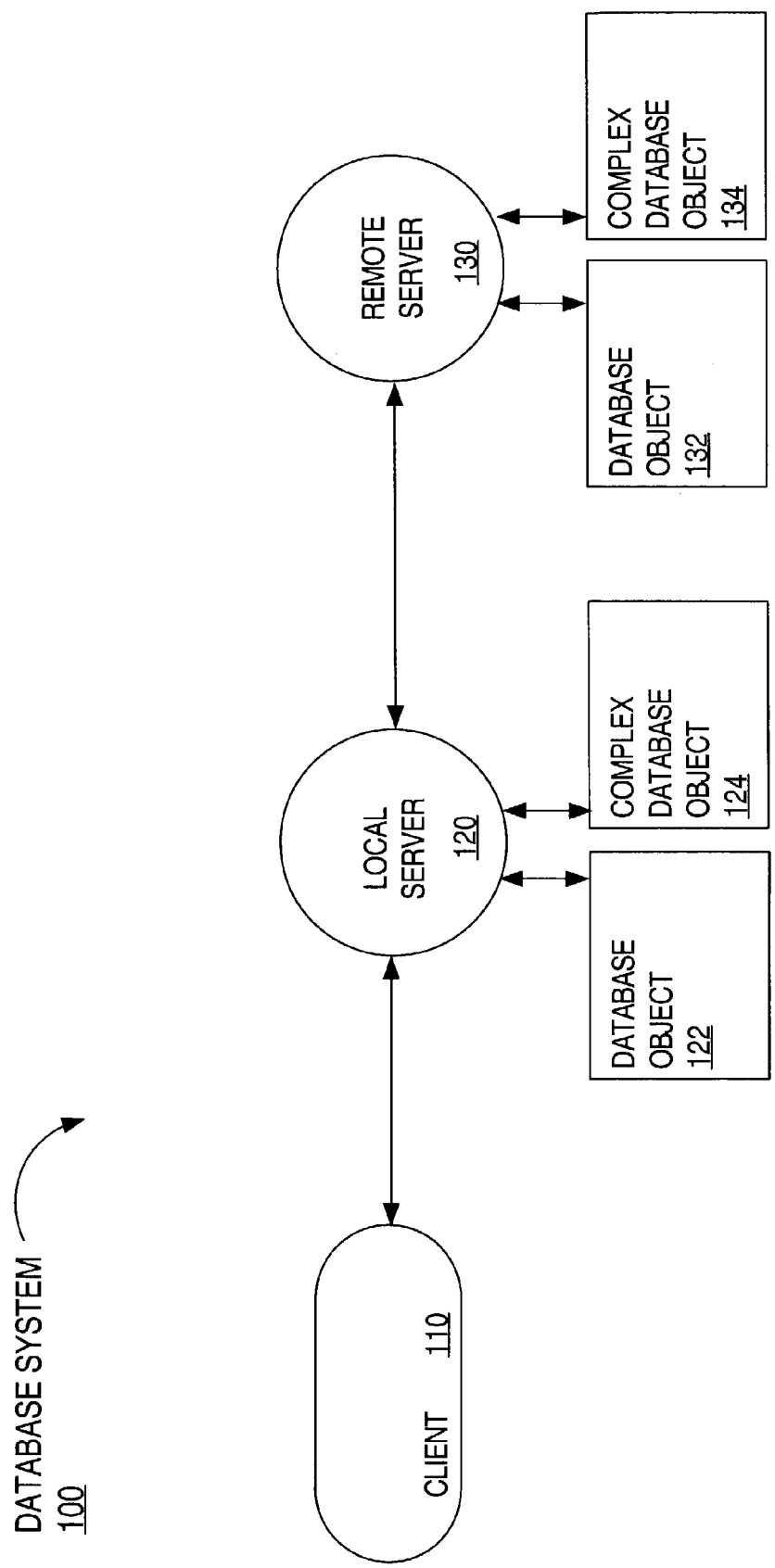
FIG. 1 is a block diagram of an exemplary database system used to illustrate inability to access a remotely located nested object prior to the present invention.
Figure 2:
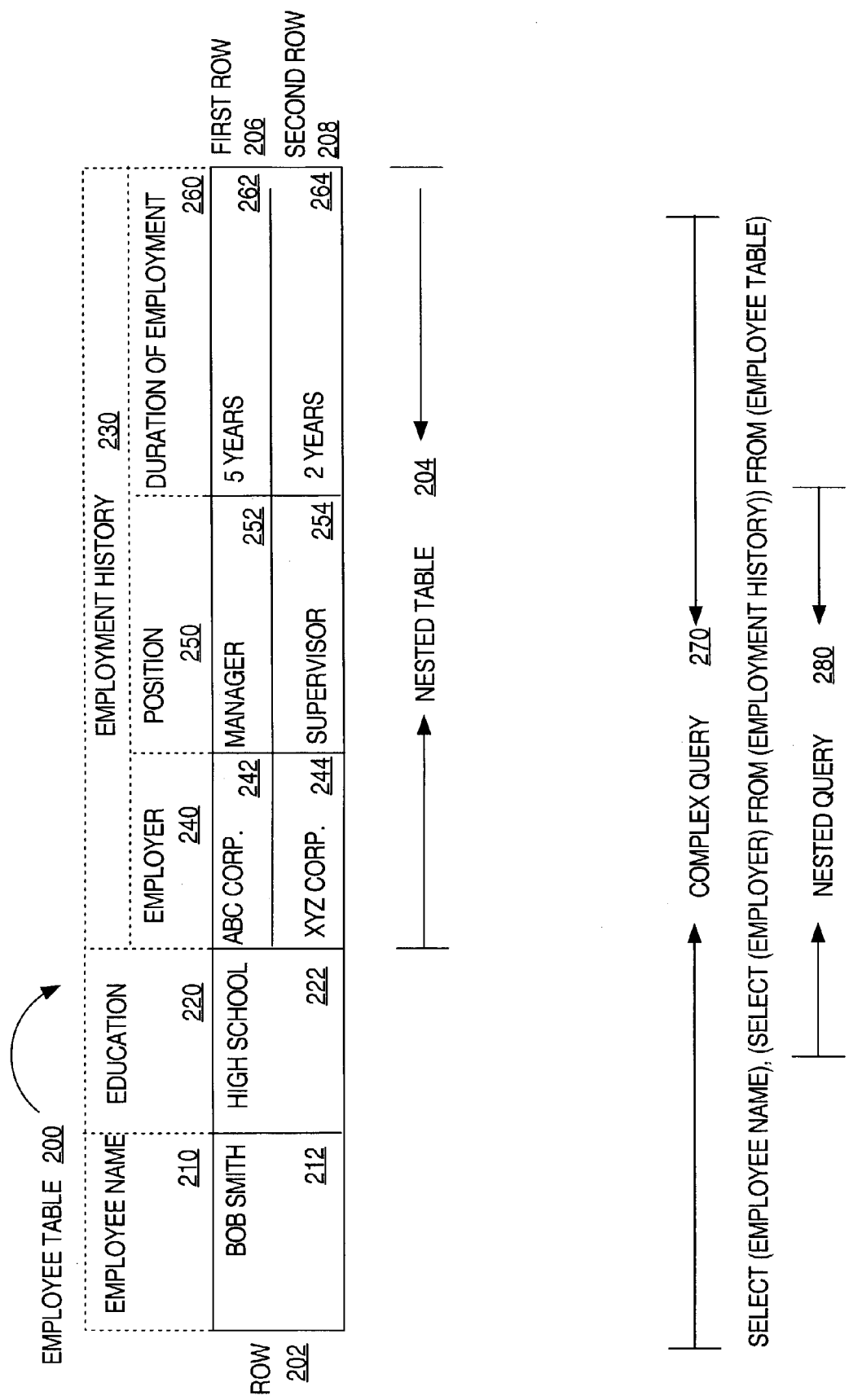
FIG. 2 illustrates an exemplary complex object, namely employee table 200; an exemplary complex query 270 on employee table 200; an exemplary nested object, namely nested table 204; and an exemplary nested query 280 on nested table 280.

A method and apparatus for accessing a remotely located nested object is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques are described herein for providing access to a remotely located nested object in a distributed database system. According to one aspect of the invention, a first server receives a request to access a complex database object that is not situated at the first server. The first server translates the request to a remote mapped request, and transmits the remote mapped request to a second server. When the first server receives data in response to the remote mapped request, it detects whether the received data includes a reference to a nested object.

If the first server detects a reference to a nested object, then the first server modifies the received data by replacing the reference with a virtual reference to the nested object. The first server also stores mapping data that associates the virtual reference with (1) the reference and (2) an "associated server" that is capable of resolving the reference. Typically, the associated server will be the server from which the first server received the reference. Thus, in the present example, the response to the remote mapped request would typically come from the second server, and consequently the second server would be the "associated server" to which the virtual reference would be mapped.

By associating the virtual reference with a server that is capable of resolving the reference, the mapping data provides, at the first server, a "location awareness" of the reference. In other words, the first server knows which other server the first server can send a request to in order to access the object associated with the reference. The first server then forwards the modified data to the requestor.

Upon storing the mapping data, the first server is capable of handling any subsequent request to access the nested object. Any such request received by the first server would use the virtual reference to refer to the nested object. Upon receiving a request to access the nested object, the first server uses the mapping data to map the virtual reference to the reference, and creates a modified request by replacing the virtual reference by the reference. The first server also uses the mapping data to identify an associated server that is capable of resolving the reference, and transmits the modified request to the associated server. The associated server is able to resolve the reference and thereby process the request to access the nested object.

The techniques described hereafter allow a client or a server to access a remotely located nested object. According to one embodiment, a server accesses a remotely located nested object using exactly the same protocol to interact with a remote server as other forms of clients. Because the server interacts with remote servers in the same manner as other clients, the server-to-server communications benefit from optimizations that have been developed for client-server interactions. These optimizations include the compressed data transfer optimization, described in U.S. Pat. No. 6,112,197; and the pre-fetch optimization, described in U.S. Pat. No. 6,421,715 B1. It is further desirable to enable these optimizations at each link in the chain of client-server interactions when a remotely located nested object is being indirectly accessed through a series of servers.

Providing Access to a Remotely Located Nested Object

Figure 3:
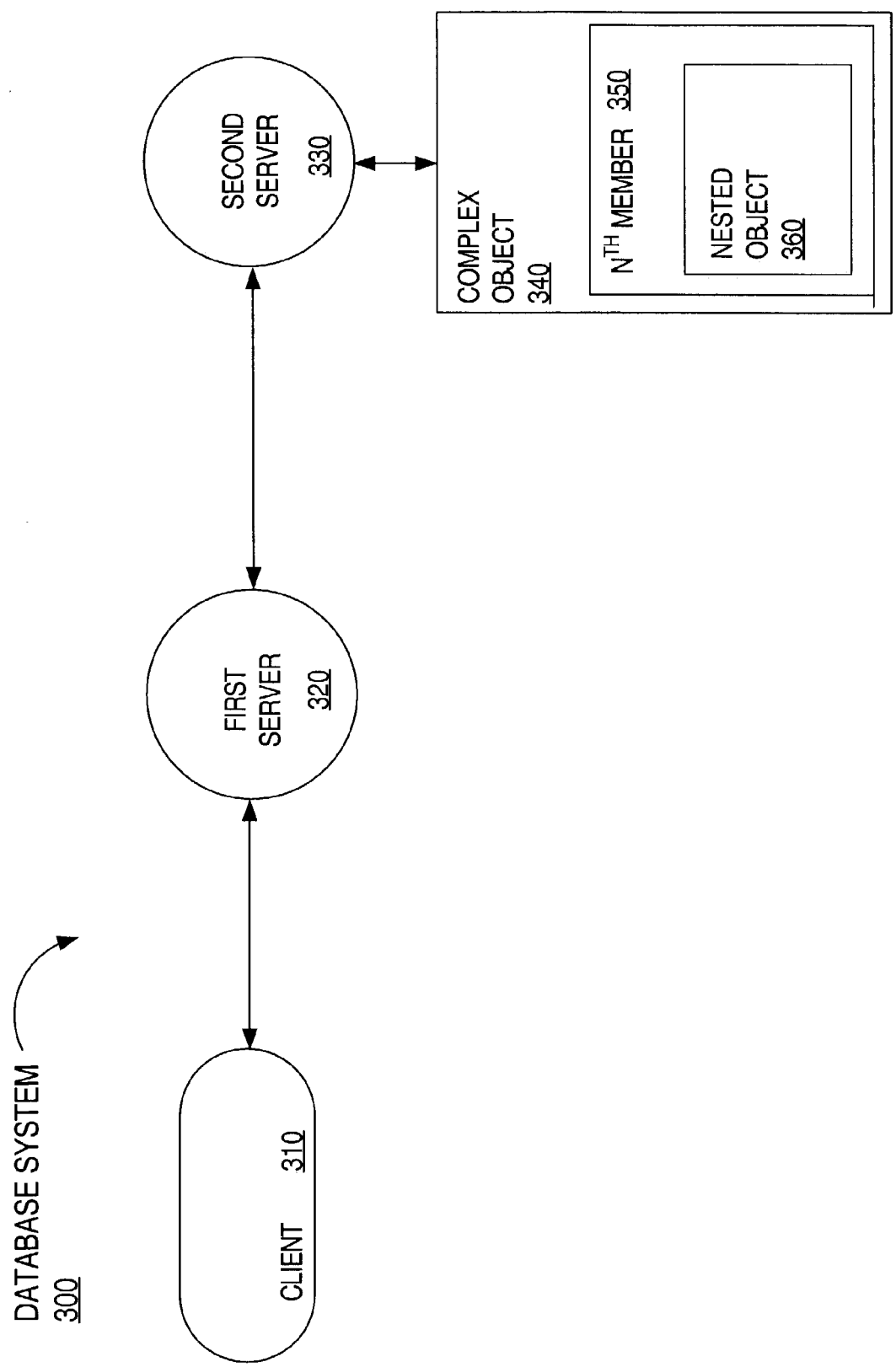
FIG. 3 is a block diagram of an exemplary database system on which an embodiment of the invention may be implemented.

FIG. 3 shows an exemplary database system 300 according to one embodiment of the present invention. A client 310 sends a first server 320 a request to access a complex object 340, wherein first server 320 is a local server with respect to client 310. Specifically, client 310 sends a request to access $n^{th}$ member 350 of complex object 340, wherein one attribute of $n^{th}$ member 350 is a nested object 360. In database system 300, complex object 340 and nested object 360 are situated at a second server 330, wherein second server 330 is a remote server with respect to client 310. Therefore, complex object 340 as well as nested object 360 are remote objects with respect to client 310. For purposes of explanation, the following description describes a request to access a single nested object within a complex object. However, one embodiment of the invention may readily be applied to process a request to access more than one nested object within a complex object by performing the processing described herein with respect to nested object 360 for each requested nested object.

In the following description, to provide an illustrative example, it is assumed that remote complex object 340 is employee table 200, and client 310 requests complex query 270 on row 202 of employee table 200. In other words, client 310 performs a fetch on row 202 of employee table 200. Therefore, in the illustrative example, the nested object 360 that client 310 has requested to access is nested table 204.

Figure 4A:
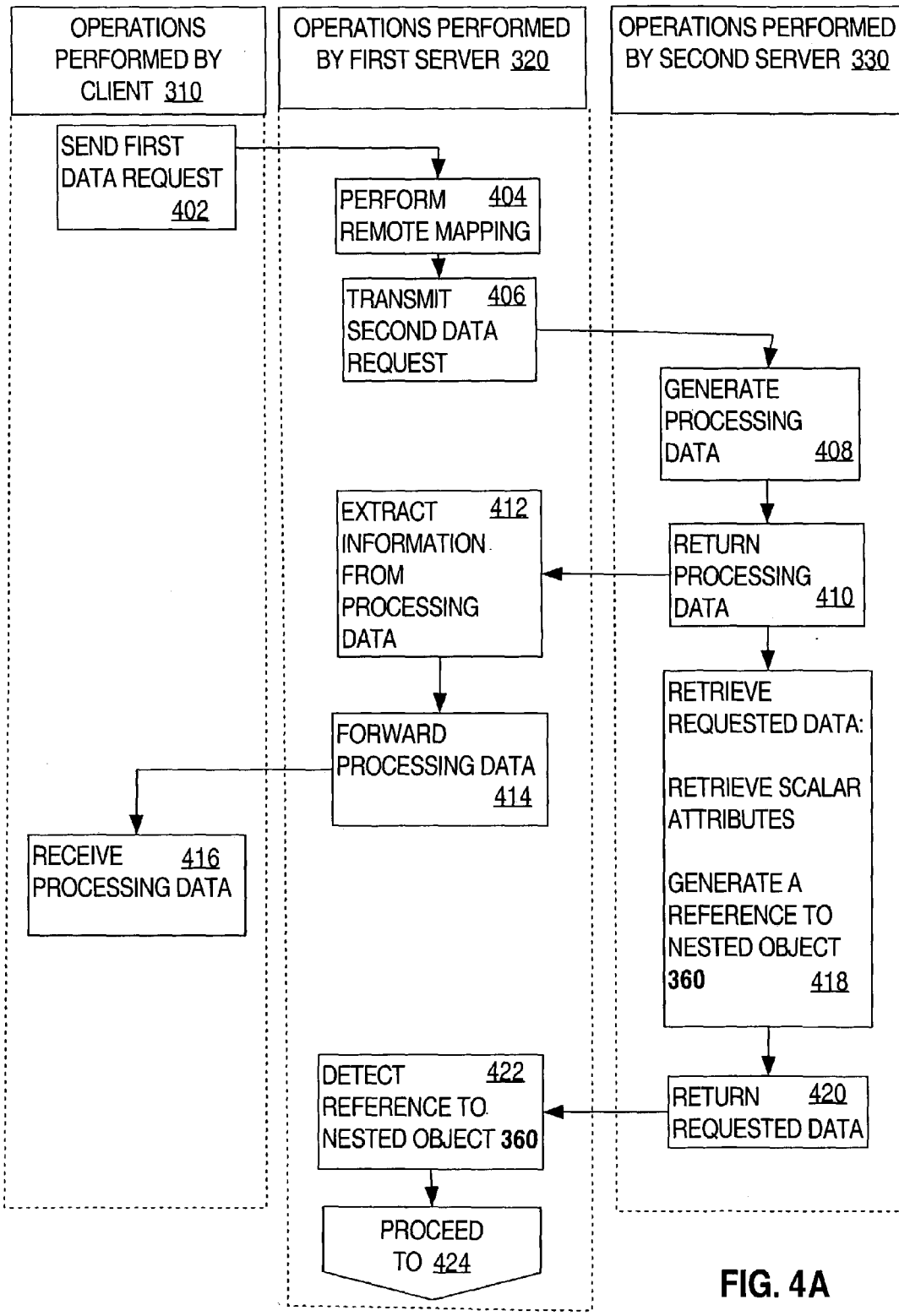
FIG. 4A and FIG. 4B are flowcharts illustrating steps for processing a request for data from a particular member of a complex object according to one embodiment of the present invention.
Figure 4B:
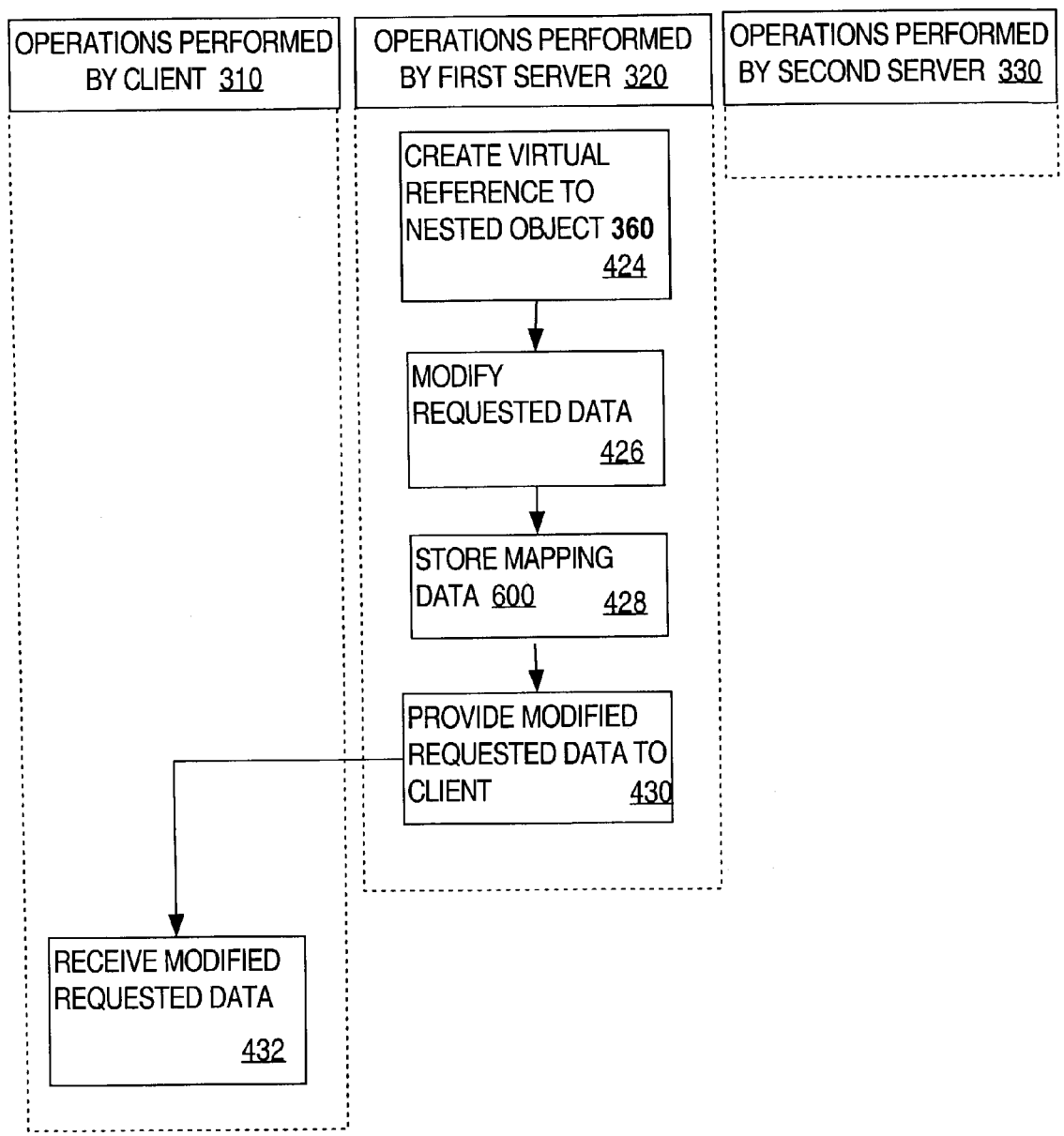
Figure 5:
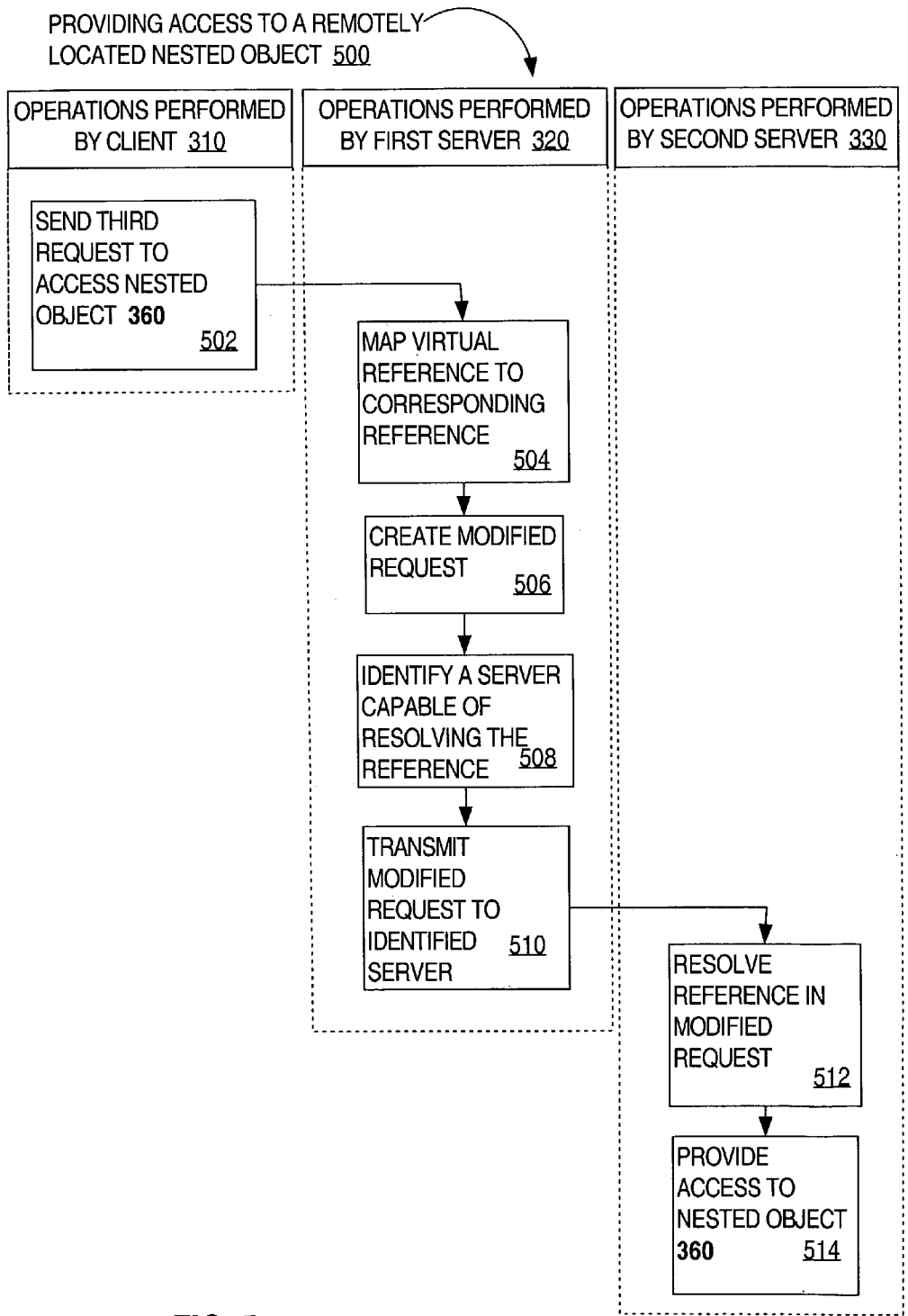
FIG. 5 is a flowchart illustrating steps for providing access to a remotely located nested object according to one embodiment of the present invention.

FIG. 4A, FIG. 4B, and FIG. 5 show processing that is carried out according to one embodiment of the invention in order to provide client 310 with access to nested object 360. FIG. 4A and FIG. 4B provide a flowchart of processing performed in system 300 to process a request for data from $n^{th}$ member 350 of complex object 340. Requesting data from $n^{th}$ member 350 of complex object 340 is used to illustrate one way for client 310 to obtain a reference to nested object 360. Client 310 may request access to nested object 360 once it has obtained a reference to nested object 360. FIG. 5 provides a flowchart of processing performed in system 300 to provide client 310 with access to remote nested object 360.

At step 402, client 310 sends a first request for data from $n^{th}$ member 350 of complex object 340 to first server 320. First server 320 receives the request and recognizes that the requested data is situated at second server 330. At step 404, second server 320 performs remote mapping. During remote mapping, the first data request is translated to a second data request for the same data from first server 320 to second server 330. At step 406, first server 320 transmits the second data request to second server 330.

Steps 408, 410, 418, and 420 constitute processing that is performed at second server 330 to process the second request and to return the requested data to first server 320. At step 408, second server 330, being the server at which the requested data is located, generates processing data required to carry out the second request. According to one embodiment, generating processing data involves the creation of data structures that store information about various aspects of the second request, including which attributes of $n^t h$ member 350 are requested, as well of the data type of each requested attribute. Since one of the attributes requested from $n^{th}$ member 350 is nested object 360, data structures created at second server 330 store information that the requested data includes a reference to nested object 360.

When complex object 340 is a complex table, generating processing data includes the creation of a cursor for the second request. The cursor stores metadata for the second request, which includes the data type of each requested field and the size of memory required to store data from each requested field. For example, when client 310 requests complex query 270 on row 202 of employee table 200, second server 330 creates a cursor that stores information about the query. The metadata for complex query 270 indicates, in part, that the employee name field 210 of employee table 200 stores a character variable, and that the size of the variable is, for example, 24 characters. Further, since the nested object in row 202 is nested table 204, metadata for complex query 270 indicates that the requested data includes a reference cursor for nested table 204.

At step 408, generating processing data also includes creating data structures to store information about each nested query in the second request. For example, generating processing data for query 270 on row 202 of employee table 200 includes the creation of a cursor for nested query 280 on nested table 204. Among other information, this cursor stores metadata as well as a row source for nested query 280.

According to one embodiment, system 300 is capable of processing a request for data from more than one member of complex object 340. For each set of common attributes that has been requested from more than one member, second server 330 introduces efficiency by generating common processing data for those attributes in step 408. For example, if a query on employee table 200 requests the employee name from more than one record, then a single cursor for employee table 200 is used to retrieve the employee name from each record.

At step 410, second server 330 returns processing data to first server 320. According to one embodiment, processing data returned to first server 320 includes metadata for the request. Since the requested data includes nested object 360, metadata returned to first server 320 indicates that the requested data will include a reference to nested object 360. For example, for complex query 270 on row 202 of employee table 200, the metadata returned to first server indicates that the requested data will include a reference cursor for nested table 204.

At step 412, first server 320 extracts information from the processing data received from second server 330. According to one embodiment, processing performed at step 412 includes storing information about the data types and sizes of requested data that will subsequently be received from second server 330. In particular, from processing data received, first server 320 obtains information that data that will subsequently be returned from second server 330 in response to the second request will include a reference to nested object 360. At step 414, first server 320 forwards the processing data to client 310. At step 416, client receives the processing data. According to one embodiment, client 310 uses the processing data to prepare for subsequently receiving the requested data. For example, client 310 allocates memory that will be required to store the requested data once it has been received. Moreover, the processing data informs client 310 that the requested data will include a nested object reference.

At step 418, second server 330 retrieves the data requested from $n^{th}$ member 350. Specifically, second server 330 retrieves scalar data from requested scalar attributes. In addition, second server 330 generates a reference to the requested nested attribute, namely, nested object 360. According to one embodiment, second server 330 may generate a reference to a nested object by invoking a particular server to generate and return a reference to the nested object. Upon completion of step 418, requested data that has been retrieved comprises retrieved scalar data from requested scalar attributes, along with references to requested nested objects.

For example, in response to complex query 270 on row 202 of employee table 200, second server 330 retrieves character string "Bob Smith" 212 from the employee name field 210 of employee table 200. In addition, second server 330 generates a reference to nested table 204. As described above, processing data generated at step 408 for complex query 270 includes a cursor for nested query 280 on nested table 204. Since nested object 204 is a table, the reference generated is a reference cursor for nested table 204. Therefore, requested data that is retrieved comprises character string "Bob Smith," along with a reference cursor for nested table 204.

At step 420, second server 330 returns the requested data to first server 320. Having received the requested data, at step 422 first server 320 detects the reference to nested object 360 in the requested data. According to one embodiment, first server 320 is made aware of the presence and location of nested object references in the requested data by processing data that was returned to first server 320 in step 410 above. For example, for complex query 270 on row 202 of nested object 360, metadata returned by second server 330 in step 410 informs first server 320 that the requested data will include a reference cursor for nested table 204. According to another embodiment, the step of detecting references to nested objects in the requested data may include determining whether a nested object reference is present in the requested data.

At step 424, for the reference to remote nested object 360 in the requested data, first server 320 creates a corresponding virtual reference to nested object 360. As described above, when complex query 270 is applied to row 202 of employee table 200, the requested data includes a reference cursor for nested table 204. In this case, first sever 320 creates a virtual reference cursor for nested table 204.

According to one embodiment, the step of creating a virtual reference may involve invoking a particular server to create and return a virtual reference to first server 320. According to one embodiment, if data is requested from more than one nested object in $n^{th}$ member 350, then the requested data returned at step 420 will contain a separate reference to each nested object, and first server 320 will create virtual references to each nested object at step 424.

A virtual reference to a nested object has the same form as a reference to a nested object, but does not actually refer to a native instance of a nested object that resides at the server that created the virtual reference. To client 310, a virtual reference created at first server 320 appears to refer to a nested object that purportedly resides at first server 320; however, the virtual reference actually refers to a remote nested object. As explained in the following discussion, a virtual reference to a remote nested object is used to provide a client access to the remotely located nested object.

At step 426, first server 320 modifies the requested data received from second server 330 by replacing the reference to nested object 360 with the corresponding virtual reference created at step 424. As described above, for complex query 270 on row 202 of employee table 200, the requested data received from second server 330 includes a reference cursor for nested table 204. In this case, at step 426, first server 320 modifies the requested data received from second server 330 by replacing the reference cursor with the virtual reference cursor for nested table 204.

Figure 6:
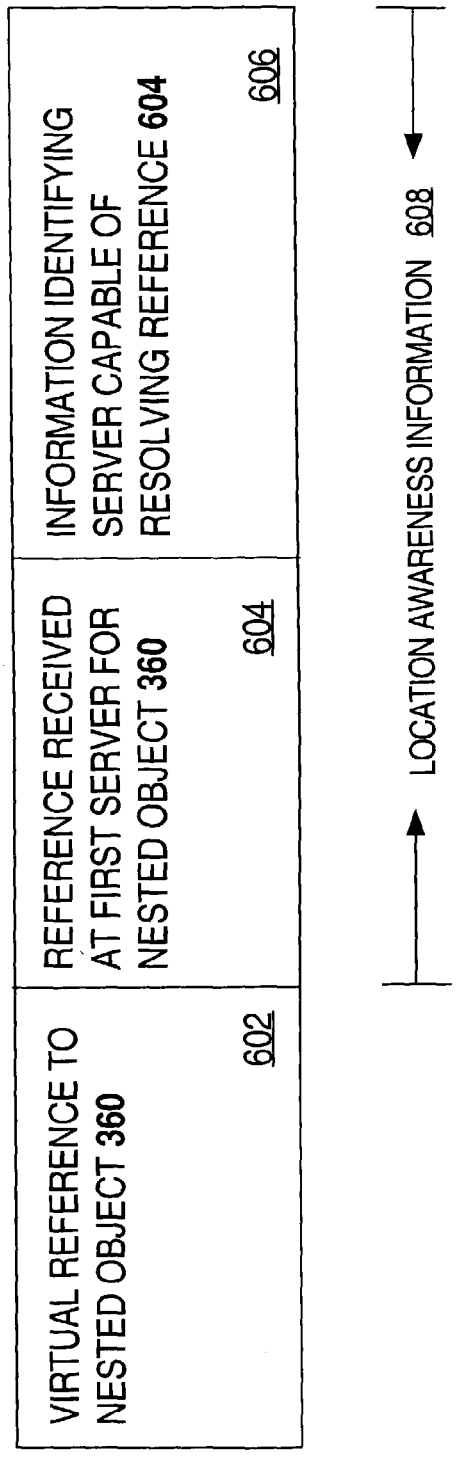
FIG. 6 illustrates exemplary mapping data stored at a particular intermediate server for a particular nested object according to one embodiment of the invention.

At step 428, first server 320 stores mapping data 600 for remote nested object 360. With reference to FIG. 6, it shows that contents of mapping data stored at first server 320 according to one embodiment of the present invention. Specifically, mapping data 600 associates virtual reference 602 to nested object 360 with the corresponding reference 604 to nested object 360, wherein reference 604 was received at first server 320 as part of the data requested from $n^{th}$ member 350 of complex object 340. For example, for complex query 270 on row 202 of employee table 200, mapping data 600 associates the virtual reference cursor for nested table 204 with the corresponding reference cursor to nested table 204, wherein the corresponding reference cursor was received at first server 320 as part of the data requested from row 202 of employee table 200.

Mapping data 600 stored at first server 320 also includes location awareness information 608 for nested object 360. As described above, the requested data received from $n^{th}$ member 350 of complex object 340 includes a reference 604 to nested object 360. Location awareness information 608 associates reference 604 with information 606 identifying a server capable of resolving reference 604. As described above, for complex query 270 on row 202 of employee table 200, requested data received at first server 320 includes a reference cursor for nested table 204. In this case, location awareness information 608 at first server 320 associates the reference cursor received in the requested data with a server capable of resolving the reference cursor.

According to one embodiment, a server capable to resolving reference 604 is the server on which nested object 360, referred to by reference 604, resides; therefore, location awareness information 608 associates reference 604 to nested object 360 with second server 330, on which nested object 360 resides. According to another embodiment, a server capable of resolving reference 604 is the server that generated reference 604; therefore, location awareness information 608 associates reference 604 to nested object 360 with second server 330, which generated reference 604.

At step 430, first server 320 provides modified requested data, which was created at step 426, to client 310. At step 432, client 310 receives the modified requested data, which includes scalar data from scalar attributes of $n^{th}$ member 350, along with virtual reference 602 to requested nested object 360. For example, for complex query 270 on row 202 of employee table 200, the modified requested data received by client 310 at step 432 includes employee name Bob Smith 210, along with a virtual reference cursor for nested table 204.

According to one embodiment, once client 310 has received virtual reference 602 to nested object 360, nested object 360 is a logically independent object from the perspective of client 310. Specifically, it appears to client 310 as if nested object 360 is logically disassociated from complex object 340. Further, once client 310 has received virtual reference 602, client 310 may request access to nested object 360. In the illustrative example, once client 310 has received a virtual reference cursor for nested table 204, client 310 may request access to nested table 204. Moreover, use of a reference to nested object 360 allows client 310 to access specific data from the nested object. Therefore, use of a reference avoids inefficiencies associated with sending all of the data from nested object 360 to client 310 each time client 310 needs to access only specific data from nested object 360.

Once a particular server has created a virtual reference to a remote nested object and has stored mapping data for the remote nested object as described above, the particular server is able to provide any database entity with access to the nested object. For example, once first server 320 has created a virtual reference for nested object 360 and has stored mapping data for nested object 360 as described above, first server 320 is able to provide any database entity access to nested object 360. FIG. 5 is a flowchart illustrating steps for processing a request from client 310 to access nested object 360 according to one embodiment of the present invention. The steps are illustrated using exemplary database system 300. Nested query 280 on first row 206 of nested table 204 is used to provide an illustrative example.

At step 502, client 310 sends a third request to access nested object 360. In the third request, client 310 uses virtual reference 602 to identify the nested object. For example, nested object 360 is nested table 204, and client 310 requests data from first row 206 of nested table 204 using nested query 280. In this case, client 310 uses a virtual reference cursor for nested table 204 to identify the nested table from which data is requested. The third request is received by first server 320. Steps 504 through 508 constitute processing performed by first server 320 to resolve virtual reference 602 that is received in the third request.

At step 504, first server 320, using the mapping data 600 stored at step 428, maps virtual reference 602 to nested object 360 to the corresponding reference 604 to nested object 360. For example, for nested query 280 on first row 206 of nested table 204, first server 320 maps the virtual reference cursor for nested table 204 to the corresponding reference cursor for nested table 204. At step 506, first server 320 modifies the third request to access nested object 360 by replacing virtual reference 602 by corresponding reference 604. In addition, according to one embodiment, the step of creating a modified request may include remote mapping the third request to the modified request.

At step 508, first server 320 uses location awareness information 608 from mapping data 600 to determine a server that is capable of resolving reference 604. As explained above, location awareness information 608 identifies second server 330 as a server capable of resolving reference 604. At step 510, first server 320 transmits the modified request to second server 510 because second server 330 is capable of resolving reference 604. The modified request is received by second server 330.

At step 512, second server 330 resolves reference 604 in the modified request. The step of resolving reference 604 includes identifying the nested object that is referred to by the reference. Accordingly, second server 330 recognizes that reference 604 refers to nested object 360. For example, for a client's request to access nested table 204, second server 330 recognizes that the reference cursor received in the modified request refers to nested table 204.

At step 514, second server 330 provides the requested access to nested object 360. Second server 330 is able to provide the requested access because nested object 360 is situated at second server 330. Providing access to nested object 360 may include performing various types of operations on the nested object. For example, providing access to nested object 360 comprises reading data from the nested object and sending the data to client 310 through first server 320. In nested query 280 on first row 206 of nested table 204, client 310 has requested the name of Bob Smith's former employer from first row 206. In this case, providing access to nested table 204 comprises sending the data from the employer field 240 of first row 206, which is ABC CORP. 242, to client 310 through first server 320. To provide another example, providing access to nested object 360 comprises modifying data within the nested object. To provide yet another example, providing access to nested object 360 comprises changing the structure of the nested object. For example, one way of changing the structure of a nested object comprises adding a row of information to the nested object.

According to one embodiment, the above techniques may be used to provide a client access to any type of nested object. Providing a client access to nested table is used to provide an illustrative example in the above discussion. To provide another example, the above techniques may be used to process a client's request to access a nested large object, or LOB. Nested LOBs may be represented, for example, by LOB locators stored in a LOB column of a table. With the retrieval of a row of the table, a LOB locator is returned with the row, rather than the LOB itself. The client then retrieves the LOB using the LOB locator as a reference. Abstract Data Type (ADT) objects are yet another example where the techniques may be used to provide access to nested objects.

Database System with One or More Intermediate Servers

In the above discussion, one embodiment has been described with reference to a request by client 310 to access nested object 360 situated at remote second server 330, wherein the only intermediate server on the path between client 310 and second server 330 is first server 320. Generally, the present invention may be used to process a request to access a remotely located nested object even if there are more than one intermediate servers on the path between the requester and the remote server on which the nested object is situated.

Figure 7:
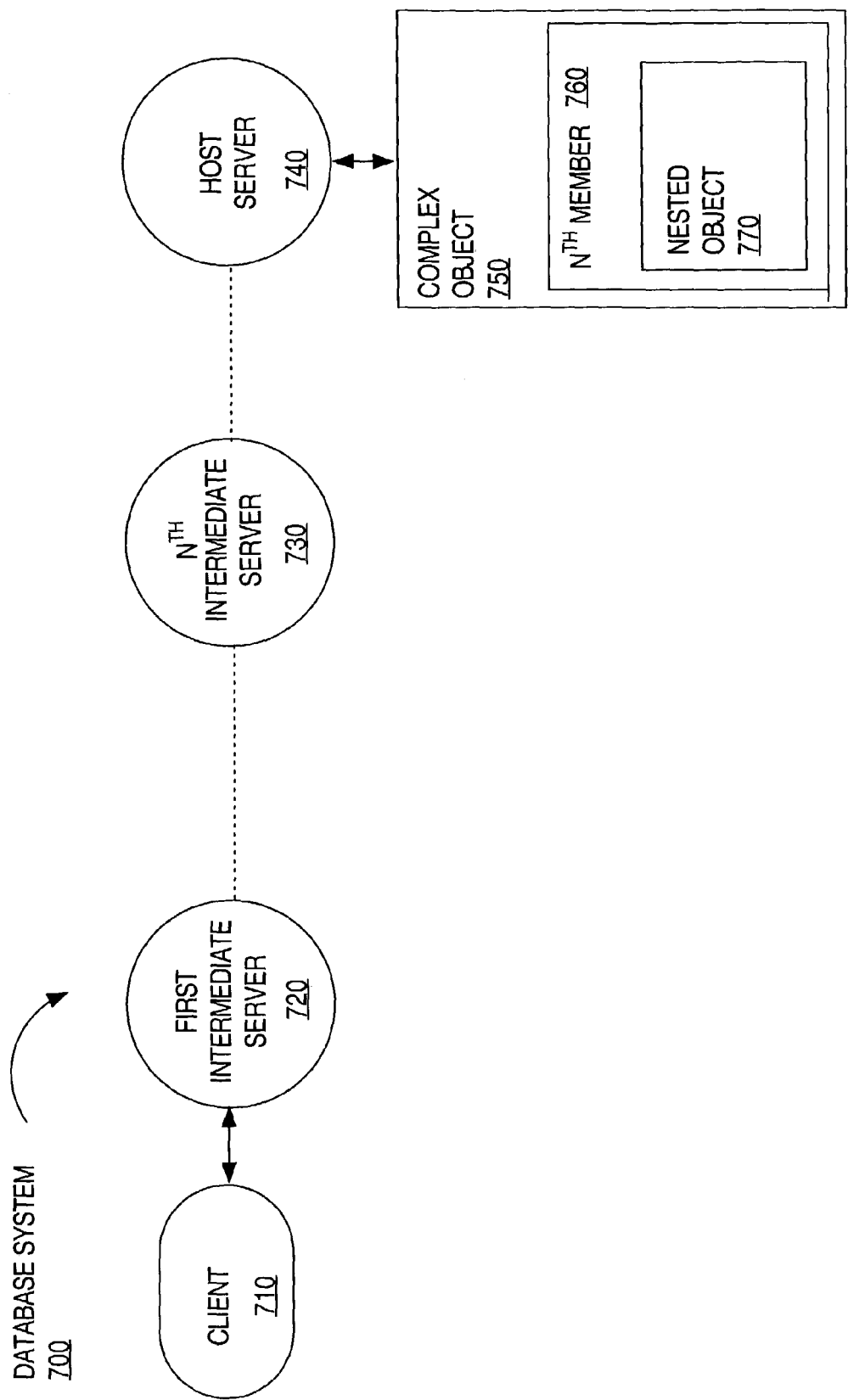
FIG. 7 is a block diagram of an exemplary database system with one or more intermediate servers on which an embodiment of the invention may be implemented.

Referring to FIG. 7, it shows a database system 700 that is used to process a request from client 710 to access nested object 770, which resides at host server 740. System 700 consists of more than one intermediate server between client 710 and host server 740. $N^{th}$ intermediate server 730 is shown in FIG. 7 as a representative intermediate server.

The following discussion of database system 700 illustrates that processing performed in database system 700 to provide client 710 access to nested object 770 is similar to processing performed in database system 300 to provide client 310 access to nested object 360. Specifically, processing performed at each intermediate server to provide client 710 access to nested object 770 is identical to processing performed at first server 320, as described above, to provide client 310 access to nested object 360. Further, processing performed by host server 740 to provide client 710 access to nested object 770 is identical to processing performed by second server 330, as described above, to provide client 310 access to nested object 360.

As described above with reference to database system 300, first server 320 receives a request for data from $n^{th}$ member 350 of complex object 340. Similarly, when client 710 requests data from $n^{th}$ member 760 of complex object 750, each intermediate server on the path between client 710 and host server 740 successively receives the request. At a particular intermediate server, the request may be received from client 710, or from another intermediate server. In system 300, upon receiving the request, first server 320 performs remote mapping of the request to a second request at step 404, which is transmitted to second server 330 at step 406. Similarly, each intermediate server in system 700 performs remote mapping of a received request to a second request, and forwards the second request to either another intermediate server or to host server 740. In this manner, the request from client 710 is forwarded through the intermediate servers to host server 740.

In system 300, upon receiving the first request, second server 330 generates processing data at step 408, which is returned to client 310 through first server 320 at steps 410 through 416. As described above, this processing data informs first server 320 that data returned in response to the request will include a reference to nested object 360. Similarly, host server 740 generates processing data upon receiving a request for data from $n^{th}$ member 760 of complex object 750. This processing data is returned to client 710 through each intermediate server on the path, and informs each intermediate server that the requested data will include a reference to nested object 770.

As described above, at step 418, second server 330 retrieves the requested data, including a generated reference to nested object 360. Second server 330 then returns the requested data, including the nested object reference, to first server 320. Similarly, host server 740 retrieves the requested data from $n^{th}$ member 760, including a generated reference to nested object 770. The requested data is then transmitted from host server 740 to client 710 through each intermediate server on the path.

As described above, upon receiving the requested data from second server 330, first server 320 detects the reference to nested object 360 at step 422, creates a virtual reference to nested object 360 at step 424, and modifies the requested data by replacing the reference in the received data by the virtual reference at step 426. According to one embodiment, each intermediate server in system 700 performs similar processing when it detects a reference to nested object 770 in the requested data that it has received. Specifically, each intermediate server creates a virtual reference to nested object 770, and modifies the requested data by replacing the reference in the requested data by the virtual reference. The virtual reference to nested object 700 created at each intermediate server has the same form as the reference to nested object 770 that is created at host server 740.

The reference to nested object 770 that is created at host server 740 may be resolved at host server 740 so as to provide access to nested object 770 because nested object 770 is situated at host server 740. In contrast, at each intermediate server, resolving a virtual reference involves mapping the virtual reference to another reference. According to one embodiment, a virtual reference may be resolved by the intermediate server that created the reference. According to another embodiment, a virtual reference may be resolved by the server on which the nested object referred to by the virtual reference is purported to reside.

As described above, at step 428, after modifying the requested data, first server 320 stores mapping data 600 that maps the virtual reference to nested object 360 to the corresponding reference to nested object 360. The mapping data also includes location awareness data that associates the corresponding reference to nested object 360 with a server that is capable to resolving the corresponding reference. Similarly, each intermediate server in system 700 stores mapping data that maps the virtual reference to nested object 770, which it created, to the corresponding reference it received as part of the requested data, and also stores location awareness data that associates the corresponding reference with a server that is capable of resolving the corresponding reference.

As described above, first server 320 provides the modified requested data to client 310 at step 430. Similarly, each intermediate server provides modified requested data, including the virtual reference it created, to the entity from which the intermediate server received the request for data. This entity may be client 710 or another intermediate server in the path to the client. The virtual reference created at each intermediate server refers to nested object 770, which is located at host server 740. However, to an entity that receives modified requested data from an intermediate server, it appears as though the virtual reference refers to a nested object located at the intermediate server. Therefore, for the receiving entity, the virtual reference purports to refer to a nested object located at the intermediate server.

Through the intermediate servers in system 700, client 710 receives the requested data from $n^{th}$ member 760 of complex object 750, wherein the requested data includes a virtual reference to nested object 770. As discussed above, at step 502, once client 310 has obtained a virtual reference to nested object 360, client 310 sends a request to access nested object 360. Similarly, once client 710 has obtained a reference to nested object 770, client 710 may send a request to access nested object 770 to first server 720.

As described above, when first server 320 receives a request to access nested object 360, the request refers to nested object 360 by using a virtual reference. At steps 504 through 510, first server 320 resolves the virtual reference in the request by mapping the virtual reference to a corresponding reference, creates a modified request by replacing the virtual reference by the corresponding reference, identifies a server that is capable of resolving the corresponding reference, and transmits the modified request to that server. Similarly, when an intermediate server receives a request to access nested object 770, the request will refer to nested object 770 by using a virtual reference that the intermediate server is capable of resolving. According to one embodiment, the intermediate server resolves the virtual reference by using previously stored mapping data to map the virtual reference to a corresponding reference to nested object 770. The intermediate server then creates a modified request by replacing the virtual reference by the corresponding reference; identifies, using location awareness data, a server capable of resolving the corresponding reference; and forwards the modified request to that server. In this manner, the request to access nested object 770 is transmitted through the intermediate servers in system 700, and reaches host server 740. Since nested object 770 resides at host server 740, host server 740 is able to resolve the reference that it previously created and provide the requested access to nested object 770.

With reference to database system 700, nested object 770 is present at a first level of nesting with respect to complex object 750 because nested object 770 is an attribute of $n^{th}$ member 760 of complex object 750. According to one embodiment, nested object 770 is also a complex object, wherein a second nested object is present at a first level of nesting with respect to nested object 770. In this case, the second nested object is present at a second level of nesting with respect to complex object 750.

According to one embodiment, techniques described herein are recursively performed to provide access to nested objects at one or more successive levels of nesting with respect to a complex object. For example, database system 700 provides access to the second nested object by recursively performing the techniques described herein. First, client 700 requests data from $n^{th}$ member 760 of complex object 750. According to one embodiment, the request for data is processed using the techniques described above with reference to FIG. 4A and FIG. 4B for processing a request for data from a particular member of a complex object, and the requested data returned to client 710 includes a reference to nested object 770. Then, client 710 makes a recursive request for data from a particular member of nested object 770. The recursive request is processed using the same techniques as are described above with reference to FIG. 4A and FIG. 4B, and the requested data returned to client 710 from the particular member of nested object 770 includes a reference to the second nested object. Thereafter, client 710 may request access to the second nested object by using the reference to the second nested object. According to one embodiment, the request is processed using the techniques described with reference to FIG. 5 for providing access to a remotely located nested object.

Transparent Communication in a Distributed Database System

According to one embodiment, the present invention provides a system that enables transparent access to remote objects. Transparent access allows an entity to access any remote object without the need for the entity to know the location of the remote object. Since an entity does not need to store information about each remote object, transparent database systems are able to provide access to a large number of distributed objects. An entity may access a remote object by sending a request to a local server, with which the entity is in direct communication, and the local server is able to process the request by forwarding the request in the direction of the remote object. According to one embodiment, the local server is able to process the request because the local server has access to the location of the remote object.

For example, as described above, in database system 700, client 710 may access remotely located nested object 770 by communicating only with first intermediate server 720. Therefore, client 710 may access nested object 770 without being aware about the other intermediate servers in system 700 or about host server 740, on which the nested object is situated. Similarly, while providing access to nested object 770, host server 740 only needs to communicate with the intermediate server from which it received the request. Therefore, host server 740 may provide client 710 access to nested object 770 without being aware about other intermediate servers or about client 710.

Transparent access to remote entities is useful in a system with a large number of database entities because it would be particularly burdensome for each entity to store information about every other entity. According to one embodiment, database system 700 provides transparent access to remote entities by using a homogeneous protocol for communication between all entities in the system. Specifically, all clients use a unique protocol whether they are communicating with a client or a server; moreover, all servers use the same protocol whether they are communicating with a client or a server. For example, the homogeneous protocol is the fetch protocol. To provide another example, the homogeneous protocol is the LOB transfer protocol.

According to one embodiment, a particular protocol used to communicate between client 710 and a local server, for example first intermediate server 720, includes various optimizations that allow efficient processing of data requests. Since a homogeneous protocol is used for communication between all entities in the system, the same particular protocol is also used for communication between two servers in the system, and the various optimizations are available in providing a client access to a remotely located nested object. According to one embodiment, the pre-fetch optimization, described in U.S. Pat. No. 6,421,715 B1, is available in providing client 710 access to remotely located nested object 770. According to another embodiment, the compressed data transfer optimization, described in U.S. Pat. No. 6,112,197, is available in providing client 710 access to remotely located nested object 770.

Hardware Overview

Figure 8:
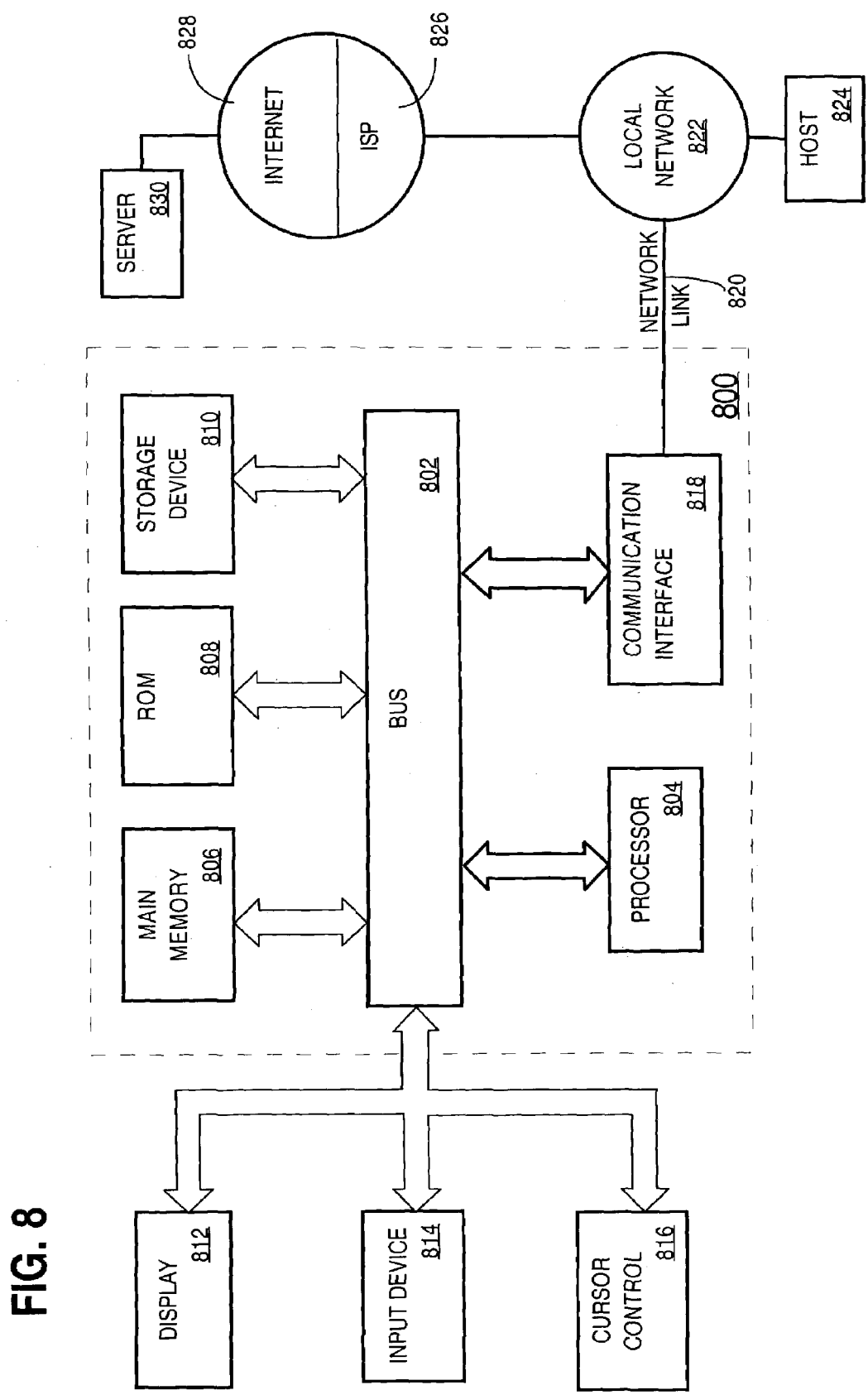
FIG. 8 is a block diagram of a computer system on which an embodiment of the invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for providing access to a remotely located nested object. According to one embodiment of the invention, processing to provide access to a remotely located nested object is performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

Using the techniques described herein, a database system is able to provide a database entity with access to a remotely located nested object. The database entity is provided with a reference to the nested object. The reference allows the database entity to access specific data from the nested object, thereby avoiding inefficiencies associated with sending all of the data from the nested object to the database entity.

The techniques described herein enable storage of large amounts of data by distributing the data among several servers, as well as efficient processing of data by storing the data in complex objects. By enabling location transparent access to nested objects, the present invention obviates the need for a data base entity to store information of each nested object it wishes to access. Further, the invention enables various optimization, such as compressed data transfer and pre-fetch, when a database entity is accessing a remote nested object.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of providing data to a requestor, the method comprising the steps of:
   receiving, at a first server, a first request for data that does not reside at said first server;
   in response to said first request, sending a second request for said data from said first server to a second server;
   in response to said second request, receiving said data at said first server;
   prior to providing said data to said requestor, determining whether said data includes a reference that purports to refer to a nested object located at a server other than said first server;
   in response to determining that said data includes a reference that purports to refer to a nested object located at a server other than said first server, performing, at said first server, the steps of:
   creating modified data by replacing the reference with a virtual reference to said nested object;
   storing mapping data that associates said virtual reference with said reference and with a server capable of resolving said reference; and
   providing said modified data to said requestor.

2. The method of claim 1, further comprising the following steps at said first server:
   receiving a third request to access said nested object, wherein said third request uses said virtual reference to identify said nested object;
   mapping, based on said mapping data, said virtual reference to said reference;
   modifying said third request by replacing said virtual reference by said reference;
   determining, based on said mapping data, the server capable of resolving said reference; and
   transmitting said modified request to the server capable of resolving said reference.

3. The method of claim 2, wherein said third request to access said nested object comprises a request to obtain data from said nested object.

4. The method of claim 3, further comprising if said data includes a reference that purports to refer to a nested object located at a server other than said first server, then performing the following steps at said first server:
   in response to said modified request, receiving said data from said nested object; and
   transmitting said data from said nested object to said requestor.

5. The method of claim 2, wherein said request to access said nested object includes a request to modify data within said nested object.

6. The method of claim 5, further comprising if said data includes a reference that purports to refer to a nested object located at a server other than said first server, then performing the step of at a particular server at which said nested object resides, modifying said data within said nested object.

7. The method of claim 2, wherein said request to access said nested object includes a request to modify the structure of said nested object.

8. The method of claim 7, further comprising if said data includes a reference that purports to refer to a nested object located at a server other than said first server, then performing the step of at a particular server at which said nested object resides, modifying the structure of said nested object.

9. The method of claim 2, wherein said nested object is a complex object containing a second nested object, and the method further comprises a the steps of:
   receiving a second response, wherein the second response is to said modified request and includes a second reference to said second nested object;
   prior to providing said second response to said requestor, performing, at said first server, the steps of:
   creating a modified second response by replacing the second reference with a second virtual reference to said second nested object;
   storing mapping data that associates said second virtual reference with said second reference and with a server capable of resolving said second reference; and
   providing said modified second response to said requestor.

10. The method of claim 1, wherein the step of receiving, at said first server, said first request for said data includes receiving said first request for said data from said requestor.

11. The method of claim 1, wherein the step of receiving, in response to said second request, said data at said first server includes receiving said data from said second server.

12. The method of claim 1, wherein said second server is capable of resolving said reference, and wherein the step of storing mapping data includes storing mapping data that associates said virtual reference with said reference and with said second server.

13. The method of claim 1, wherein said data includes a reference that purports to refer to a nested object located on said second server.

14. The method of claim 1, wherein the step of determining whether said data includes a reference that purports to refer to a nested object located at a server other than said first server includes determining whether said data includes a reference cursor that purports to refer to a nested table located at a server other than said first server.

15. The method of claim 14, wherein the step of creating modified data includes replacing said reference cursor with a virtual reference cursor that refers to said nested table.

16. The method of claim 15, wherein the step of storing mapping data includes storing mapping data that associates said virtual reference cursor with said reference cursor and with a server capable of resolving said reference cursor.

17. The method of claim 1, wherein the step of determining whether said data includes a reference that purports to refer to a nested object located at a server other than said first server includes determining whether said data includes a large object (LOB) locator that purports to refer to a nested LOB located at a server other than said first server.

18. The method of claim 17, wherein the step of creating modified data includes replacing said LOB locator with a virtual LOB locator that refers to said nested LOB.

19. The method of claim 18, wherein the step of storing mapping data includes storing mapping data that associates said virtual LOB locator with said LOB locator and with a server capable of resolving said LOB locator.

20. The method of claim 1, wherein said requestor simulates a client in sending said first request to said first server according to a particular client-to-server protocol, and wherein said first server simulates said client in sending said second request to said second server according to said particular client-to-server protocol.

21. The method of claim 1, wherein said data is received at said first server from a particular server, wherein said first server simulates a client in receiving said data according to a particular server-to-client protocol, and wherein said first server, acting as a server, provides said modified data to said requestor, which simulates said client in receiving said data according to said particular server-to-client protocol.

22. The method of claim 21, wherein, both the step of receiving said data at said first server and the step of providing said modified data to said requestor are performed using compressed data transfer optimizations.

23. The method of claim 1, wherein communication between said requestor and said first server occurs according to a particular protocol, wherein communication between said first server and said second server occurs according to said particular protocol, and wherein communication between a particular server from which said data is received at said first server and said first server occurs according to said particular protocol.

24. The method of claim 23, wherein communication between the requestor and the first server, between the first server and the second server, and between the first server and the particular server incorporates the efficiencies of prefetch optimizations.

25. A computer program stored in memory carrying instructions for providing data to a requestor, the instructions comprising instructions for performing the steps of:
receiving, at a first server, a first request for data that does not reside at said first server;
in response to said first request, sending a second request for said data from said first server to a second server;
in response to said second request, receiving said data at said first server;
prior to providing said data to said requestor, determining whether said data includes a reference that purports to refer to a nested object located at a server other than said first server;
in response to determining that said data includes a reference that purports to refer to a nested object located at a server other than said first server, performing, at said first server, the steps of:
creating modified data by replacing the reference with a virtual reference to said nested object;
storing mapping data that associates said virtual reference with said reference and with a server capable of resolving said reference; and
providing said modified data to said requestor.

26. The computer-readable medium of claim 25, further comprising instructions for performing the following steps at said first server:
receiving a third request to access said nested object, wherein said third request uses said virtual reference to identify said nested object;
mapping, based on said mapping data, said virtual reference to said reference;
modifying said third request by replacing said virtual reference by said reference;
determining, based on said mapping data, the server capable of resolving said reference; and
transmitting said modified request to the server capable of resolving said reference.

27. The computer-readable medium of claim 26, wherein said request to access said nested object comprises a request to obtain data from said nested object.

28. The computer-readable medium of claim 27, further comprising instructions for performing the following steps at said first server if said data includes a reference that purports to refer to a nested object located at a server other than said first server:
in response to said modified request, receiving said data from said nested object; and
transmitting said data from said nested object to said requestor.

29. The computer-readable medium of claim 26, wherein said request to access said nested object includes a request to modify data within said nested object.

30. The computer-readable medium of claim 29, further comprising instructions for performing the step of, if said data includes a reference that purports to refer to a nested object located at a server other than said first server, then at a particular server at which said nested object resides, modifying said data within said nested object.

31. The computer-readable medium of claim 26, wherein said request to access said nested object includes a request to modify the structure of said nested object.

32. The computer-readable medium of claim 31, further comprising instructions for performing the step of, if said data includes a reference that purports to refer to a nested object located at a server other than said first server, then at a particular server at which said nested object resides, modifying the structure of said nested object.

33. The computer-readable medium of claim 26, wherein said nested object is a complex object containing a second nested object, and the computer-readable medium further comprises, then performing the steps of:
receiving a second response, wherein the second response is to said modified request and includes a second reference to said second nested object;

prior to providing said second response to said requestor, performing, at said first server, the steps of:
  creating a modified second response by replacing the second reference with a second virtual reference to said second nested object;
  storing mapping data that associates said second virtual reference with said second reference and with a server capable of resolving said second reference; and
  providing said modified second response to said requestor.

34. The computer-readable medium of claim 25, wherein the step of receiving, at said first server, said first request for said data includes receiving said first request for said data from said requestor.

35. The computer-readable medium of claim 25, wherein the step of receiving, in response to said second request, said data at said first server includes receiving said data from said second server.

36. The computer-readable medium of claim 25, wherein said second server is capable of resolving said reference, and wherein the step of storing mapping data includes storing mapping data that associates said virtual reference with said reference and with said second server.

37. The computer-readable medium of claim 25, wherein said data includes a reference that purports to refer to a nested object located on said second server.

38. The computer-readable medium of claim 25, wherein the step of determining whether said data includes a reference that purports to refer to a nested object located at a server other than said first server includes determining whether said data includes a reference cursor that purports to refer to a nested table located at a server other than said first server.

39. The computer-readable medium of claim 38, wherein the step of creating modified data includes replacing said reference cursor with a virtual reference cursor that refers to said nested table.

40. The computer-readable medium of claim 39, wherein the step of storing mapping data includes storing mapping data that associates said virtual reference cursor with said reference cursor and with a server capable of resolving said reference cursor.

41. The computer-readable medium of claim 25, wherein the step of determining whether said data includes a reference that purports to refer to a nested object located at a server other than said first server includes determining whether said data includes a large object (LOB) locator that purports to refer to a nested LOB located at a server other than said first server.

42. The computer-readable medium of claim 41, wherein the step of creating modified data includes replacing said LOB locator with a virtual LOB locator that refers to said nested LOB.

43. The computer-readable medium of claim 42, wherein the step of storing mapping data includes storing mapping data that associates said virtual LOB locator with said LOB locator and with a server capable of resolving said LOB locator.

44. The computer-readable medium of claim 25, wherein said requestor simulates a client in sending said first request to said first server according to a particular client-to-server protocol, and wherein said first server simulates said client in sending said second request to said second server according to said particular client-to-server protocol.

45. The computer-readable medium of claim 25, wherein said data is received at said first server from a particular server, wherein said first server simulates a client in receiving said data according to a particular server-to-client protocol, and wherein said first server, acting as a server, provides said modified data to said requestor, which simulates said client in receiving said data according to said particular server-to-client protocol.

46. The computer-readable medium of claim 45, wherein, both the step of receiving said data at said first server and the step of providing said modified data to said requestor are performed using compressed data transfer optimizations.

47. The computer-readable medium of claim 25, wherein communication between said requestor and said first server occurs according to a particular protocol, wherein communication between said first server and said second server occurs according to said particular protocol, and wherein communication between a particular server from which said data is received at said first server and said first server occurs according to said particular protocol.

48. The computer-readable medium of claim 47, wherein communication between the requestor and the first server, between the first server and the second server, and between the first server and the particular server incorporates the efficiencies of prefetch optimizations.

* * * * *

UNITED STATES PATENT AND TRADEMARK OFFICE
CERTIFICATE OF CORRECTION

PATENT NO. : 7,099,888 B2
APPLICATION NO. : 10/400735
DATED : August 29, 2006
INVENTOR(S) : Sreenivas Gollapudi et al.

It is certified that error appears in the above-identified patent and that said Letters Patent is hereby corrected as shown below:

Column 18
Line 43, delete "comprises a the" and insert --comprises the--.

Column 20
Line 64, delete "comprises, then performing the" and insert --comprises the--.

Signed and Sealed this

Twenty-first Day of November, 2006

JON W. DUDAS
*Director of the United States Patent and Trademark Office*